US006789500B2

(12) United States Patent
Rozenboim (10) Patent No.: US 6,789,500 B2
(45) Date of Patent: Sep. 14, 2004

(54) METHODS FOR GROWTH STIMULATION (75) Inventor: Israel Rozenboim, Mazkeret Batya (IL)

(73) Assignees: Willmar Poultry Company, Inc., Willmar, MN (US); Optimum Light Technology, Ltd., Jerusalem (IL)

( * ) Notice: Subject to any disclaimer, the term of this patent is extended or adjusted under 35 U.S.C. 154(b) by 0 days.

(21) Appl. No.: 10/087,617

(22) Filed: Feb. 27, 2002

(65) Prior Publication Data

US 2003/0003437 A1 Jan. 2, 2003

Related U.S. Application Data

(60) Provisional application No. 60/271,897, filed on Feb. 27, 2001.

(51) Int. Cl.$^7$ .............................................. A01K 45/00
(52) U.S. Cl. ...................................................... 119/6.8
(58) Field of Search .............................. 119/6.8, 6.5, 6.6

(56) References Cited

U.S. PATENT DOCUMENTS

| 798,697 | A | | 9/1905 | Perkins | |
|---|---|---|---|---|---|
| 1,325,834 | A | | 12/1919 | Khotinsky | |
| 1,535,465 | A | | 4/1925 | Hackman | |
| 1,827,530 | A | | 10/1931 | Grand | |
| 4,378,758 | A | | 4/1983 | Coleman | |
| 4,604,968 | A | * | 8/1986 | Christensen | 119/6.8 |
| 4,625,728 | A | * | 12/1986 | Schonberg | 119/6.8 |
| 4,765,337 | A | | 8/1988 | Schonberg | |
| 4,973,595 | A | * | 11/1990 | Robel | 119/6.8 |
| 5,011,780 | A | * | 4/1991 | Perry | 119/6.8 |
| 5,575,237 | A | * | 11/1996 | Ferguson | 119/6.8 |

FOREIGN PATENT DOCUMENTS

| DE | 19530915 A | 3/1996 |
|---|---|---|
| GB | 2032752 A | 5/1980 |
| GB | 2088689 A | 6/1982 |
| RU | 1831281 A | 7/1993 |
| RU | 2101939 C | 1/1998 |
| RU | 2142225 C | 12/1999 |
| RU | 2150826 C | 6/2000 |
| SU | 1010741 A | 3/1984 |
| SU | 1153860 A | 5/1985 |
| SU | 1209127 A | 2/1986 |

OTHER PUBLICATIONS

Bursian, "Changes in chick embryo motility under the effect of monochromatic light during the early stages of development," *Fiziol Zh SSSR Im I M Sechanova*, Sep.;1965; 51(9):1090–1093. (English Translation Included.).

Coleman et al., "The Effect of Light and Specific Gravity on Embryo Weight and Embryonic Mortality," *Poultry Science*, Sep. 1975; 54(5):1415–1421.

Coleman et al., "Light alterated changes in the embroynic age *versus* incubation age of white leghorn embryos," *Poultry Science*, Nov. 1976; 55(6):2483–2485.

Cooper, "Effect of light during incubation on hatchability of turkey eggs," *Poultry Sci.*, Jul. 1972; 51(4):1105–1108.

Douglas et al., "Effect of Presolvent Extraction Processing Method on the Nutritional Value of Soybean Meal for Chicks," *Poultry Science*, Nov. 2000; 79(11):1623–1626.

Fairchild et al., "Physiology and Reproduction: Photostimulation of Turkey Eggs Accelerates Hatching Times Without Affecting Hatchability, Liver or Heart Growth, or Glycogen Content," *Poultry Science*, 2000 Oct.; 79(10):1627–1631.

(List continued on next page.)

*Primary Examiner*—Charles T. Jordan
*Assistant Examiner*—Elizabeth Shaw
(74) *Attorney, Agent, or Firm*—Mueting, Raasch & Gebhardt, P.A.

(57) ABSTRACT

The present invention provides methods for exposing an avian embryo to light during incubation. The methods may be used to increase a bird's weight, increase muscle weight in a bird, and decrease the mortality rate of a bird.

32 Claims, 6 Drawing Sheets

OTHER PUBLICATIONS

Halevy et al., "The Effects of Growth Hormone on Avian Skeletal Muscle Satellite Cell Proliferation and Differentiation," *Gen Comp. Endocrinol.*, Jan. 1996; 101(1):43–52.

Halevy et al., "Various light source treatments affect body and skeletal muscle growth by affecting skeletal muscle satellite cell proliferation in broilers," *Comp. Biochem. Physiol. A Mol. Integr. Physiol.*, 1998; 120(2); 317–323.

Kocamis et al., "Effect of In Ovo Administration of Insulin–Like Growth Factor–I on Composition and Mechanical Properties of Chicken Bone," *Poultry Science*, Sep 2000; 79(9): 1345–1350.

Kocamis et al., "Expression of IGF–I, IGF–II, FGF, and TGF–β2 During Chicken Embryonic Development with Emphasis on Skeletal Muscle," *FASEB*, Mar. 15, 2000; 14(4):A315.

Lauber et al., "Accelerated growth of embryo chicks under the influence of light," *Growth*, 1964;28:179–190.

McFarland, "Influence of growth factors on poultry myogenic satellite cells," *Poult Sci.*, May 1999; 78(5):747–758.

McMurtry et al., "Developmental Changes in Embryonic and Extra Embryonic Insulin–Like Growth Factor–1 Tissue Concentrations in the Turkey Embryo," *Poultry Science*, Jun. 1997; 76(6):894–900.

Phogat et al., "Effect of Red and Green Lights on Growth of Qualis," *Indian Journal of Poultry Science*, 1985; 20(2):126–128.

Rogers et al., "Research Report: Exposure to different wavelengths of light and the development of structural and functional asymmetries in the chicken," *Behav. Brain Res.*, 1996; 80:65–73.

Rol de Lama et al., "Sexual Dimorphism in Growth as Measured by Microknemometry: Different Responses to GH Deficiency and Exogenous GH Administration," *Neuroendocrinol.*, 1998; 68:210–219.

Romanoff, *The Avian Embryo: structural and functional development*, MacMillan, NY, 1960, Cover page, Publication page, and Table of Contents only.

Rozenboim et al., "Research Notes: The Effect of Monochromatic Light on Broiler Growth and Development," *Poultry Science*, Jan. 1999; 78(1):135–138.

Shutze et al., "Influence of incandescent and coloured light on chicken embryos during incubation," *Nature (Lond.).*, Nov. 10, 1962; 196(4854):594–595.

Siegel et al., "Photoacceleration of development in chick embryos," *Comp. Biochem. Physiol.*, 1969; 28:753–758.

Wabek et al., "Influences of Radiant Energy from Fluorescent Light Sources on Growth, Mortality, and Feed Conversion of Broilers," *Poultry Science*, Nov. 1974; 53(6):2055–2059.

* cited by examiner

METHODS FOR GROWTH STIMULATION

CONTINUING APPLICATION DATA

This application claims the benefit of U.S. Provisional Application Serial No. 60/271,897, filed Feb. 27, 2001, which is incorporated by reference herein.

BACKGROUND

The poultry industry generally involves the incubation, hatching and feeding of millions of birds each week in the United States alone. A single hatchery can handle more than 500,000 chicks per week. Improvements in the various stages of development of commercial poultry can translate into significant cost savings and efficiencies. For example, improved hatching yields, shortened periods for feeding, and increased size of poultry produced can provide substantially increased profits.

Meat production by domestic animals is inherently inefficient and this is mainly reflected in higher costs during the growth and the finishing phases of production. For example, commercial production of poultry in the major poultry-food importing countries (for example, Israel) is several times more expensive than in poultry-food exporting countries. This is due to the fact that in any system of poultry meat production, feed costs form up to 70% of total costs. Therefore, increasing the speed and biological efficiency of muscle growth would both increase the economic efficiency of meat production, and its improved biological efficiency would also be expected to produce more meat and less fat at any point in time during production. This alteration in the composition of weight gain in meat producing animals would enhance the nutritional value of the end product, an issue of increasing importance particularly in the United States.

Muscle growth is a function of protein accretion and cell proliferation. Muscle protein accretion is a function of protein synthesis and degradation, and the balance between protein synthesis and degradation determines the net gain or loss of muscle mass. Although protein accretion is an important aspect of muscle growth, it is limited within the existing cellular framework. Myogenic cell proliferation and differentiation during pre- and postnatal life establish this cellular framework and set limits on postnatal muscle growth.

Muscle growth in poultry can be influenced by local and circulating growth factors and hormones. Methods known in the art can manipulate levels of these factors in vivo by nutritional, genetic and environmental manipulations. Alternatively, methods known in the art alter these factors by administering growth hormones to the poultry to increase muscle growth. However, such administration requires regulatory approval and is not generally preferred by the consuming public.

SUMMARY OF THE INVENTION

The present invention represents an advance in the art of increasing meat production by poultry. It is known that exposure of birds to certain types of light after hatching can influence several characteristics of the birds. The present invention describes the exposure of eggs to certain wavelengths of light. Unexpectedly, such exposure caused increases in performance characteristics, and these characteristics manifested themselves later in the life of the birds. Moreover, the characteristics were predominant in females, and generally not in males.

The present invention provides methods for exposing an embryo to light. The method includes exposing an egg, preferably a chicken egg or a turkey egg, to a monochromatic light for an intermittent photoperiod that includes a light period and dark period. The light period and the dark period may each independently be at least about 3 minutes, at least about 15 minutes, preferably, about 3 minutes to about 15 minutes. The monochromatic light may include a peak wavelength of at least about 500 nanometers (nm) to no greater than about 590 nm, preferably, at least about 550 nm to no greater than about 570 nm, most preferably, about 560 nm. Preferably, the monochromatic light has an intensity of at least about 0.001 watts/m$^2$ to no greater than about 0.2 watts/m$^2$.

The present invention also provides a method for increasing a bird's weight. The method includes exposing an egg, preferably a chicken egg or a turkey egg, to a monochromatic light for a photoperiod, and hatching the egg, wherein the bird, preferably a hen, that hatches from the egg has a greater weight at about 28 days after hatching compared to a bird that hatches from an egg not exposed to the monochromatic light. The photoperiod may be an intermittent photoperiod that includes a light period and a dark photoperiod. The light period and the dark period may each independently be at least about 3 minutes, at least about 15 minutes, preferably, about 3 minutes to about 15 minutes. The monochromatic light may include a peak wavelength of at least about 500 nm to no greater than about 590 nm, preferably, at least about 550 nm to no greater than about 570 nm, most preferably, about 560 nm. Preferably, the monochromatic light has an intensity of at least about 0.001 watts/m$^2$ to no greater than about 0.2 watts/m$^2$.

Also provided by the present invention is a method for increasing muscle weight in a bird, preferably a hen. The method includes exposing an egg to a monochromatic light for a photoperiod, and hatching the egg, wherein the bird that hatches from the egg has greater muscle weight at about 28 days after hatching compared to a bird that hatches from an egg not exposed to the monochromatic light. Preferably, the muscle is breast muscle. The photoperiod may be an intermittent photoperiod that includes a light period and a dark photoperiod. The light period and the dark period may each independently be at least about 3 minutes, at least about 15 minutes, preferably, about 3 minutes to about 15 minutes. The monochromatic light may include a peak wavelength of at least about 500 nm to no greater than about 590 nm, preferably, at least about 550 nm to no greater than about 570 nm, most preferably, about 560 nm. Preferably, the monochromatic light has an intensity of at least about 0.001 watts/m$^2$ to no greater than about 0.2 watts/m$^2$.

The present invention further provides a method for decreasing a mortality rate of a bird, preferably a hen. The method includes exposing an egg, preferably a chicken egg or a turkey egg, to a monochromatic light for a photoperiod, and hatching the egg, wherein the mortality rate of a bird that hatches from the egg has a lower mortality rate compared to a bird that hatches from an egg not exposed to the monochromatic light. The photoperiod may be an intermittent photoperiod that includes a light period and a dark photoperiod. The light period and the dark period may each independently be at least about 3 minutes, at least about 15 minutes, preferably, about 3 minutes to about 15 minutes. The monochromatic light may include a peak wavelength of at least about 500 nm to no greater than about 590 nm, preferably, at least about 550 nm to no greater than about 570 nm, most preferably, about 560 nm. Preferably, the monochromatic light has an intensity of at least about 0.001 watts/m$^2$ to no greater than about 0.2 watts/m$^2$.

BRIEF DESCRIPTION OF THE FIGURES

FIG. 4. Body weight results of turkey toms (a), and turkey hens (b) incubated under green light or dark conditions. Bars represents mean ±S.E. Values marked with different letters are significantly different (P<0.05).

FIG. 7. Body weight results of male (a) and female (b) turkey poults incubated under green, white, or dark light conditions. Bars presents mean ±S.E. Values marked with different letters are significantly different (P<0.05).

FIG. 8. Breast muscle weight (a) and percent breast muscle from body weight at 79 day of age, of turkey poults incubated under green, white, or dark light conditions. Bars present mean ±S.E. Values marked with different letters are significantly different (P<0.05).

DETAILED DESCRIPTION OF PREFERRED EMBODIMENTS OF THE INVENTION

The present invention provides methods for enhancing performance characteristics of members of the Class Aves. The performance characteristics include, for instance, increasing a bird's weight, increasing a bird's muscle growth, stimulating growth after hatching, and decreasing a bird's mortality rate. The methods typically involve exposing an egg to a monochromatic light for a photoperiod during incubation of the egg. The egg is preferably a poultry egg, for instance, chicken, turkey, duck, or goose. Unless otherwise specified, "a," "an," "the," and "at least one" are used interchangeably and mean one or more than one.

As used herein, "monochromatic light" refers to light having a substantial portion of the emission at a peak wavelength. Monochromatic light useful in the present invention is preferably in the visible spectrum (from about 400 nanometers (nm) to about 700 nm). In increasing order of preference, monochromatic light useful in the present invention has a peak wavelength of at least about 500 nm, at least about 510 nm, at least about 520 nm, at least about 530 nm, at least about 540 nm, at least about 550 nm, more preferably, at least about 555 nm. In increasing order of preference, monochromatic light useful in the present invention has a peak wavelength of no greater than about 590 nm, no greater than about 580 nm, no greater than about 570 nm, more preferably, no greater than about 565 nm. Most preferably, monochromatic light has a peak wavelength of about 560 nm.

Optionally and preferably, monochromatic light useful in the present invention further includes other wavelengths in a distribution or range around a peak wavelength. This range, referred to herein as "half band +/−," is half band +/− about 15 nm, more preferably, half band +/− about 20 nm, most preferably, half band +/− about 25 nm.

A radiation source providing monochromatic light can be used in the present invention. Radiation sources include, for instance, monochromatic fluorescent lamps, monochromatic incandescent lamps, and monochromatic light emitting diodes (LEDs). Radiation sources providing monochromatic light are well known to the art and are commercially available. In some preferred aspects of the present invention, LEDs emitting light having a peak wavelength of about 560 nm (half band +/− about 15 nm) are used. Such LEDs are commercially available from, for instance, Optimum Light Technology, Ltd. (Jerusalem, Israel).

The exposure of an egg to monochromatic light can begin immediately when incubation begins, more preferably, about 24 hours after incubation begins, most preferably, about 5 days after incubation begins. The exposure of an egg to monochromatic light can proceed until the end of incubation of the eggs, more preferably, until the eggs are hatched, most preferably, until the hatched birds leave the hatchery. In some aspects of the present invention, eggs are treated with monochromatic light substantially throughout incubation, until hatch. As used herein, "substantially throughout incubation" refers to a period of time including about 75%, preferably, about 80%, more preferably, about 90%, of the total incubation time. Typically, incubation of the eggs lasts for a duration of about 21 days to about 28 days, although one of skill in the art will readily comprehend that the incubation period can be influenced by a number of environmental factors and the source of the egg (e.g., chicken, turkey, duck, or goose). The conditions for incubation of an egg include, for instance, temperature, humidity, and movement of the egg during the incubation period. Such conditions are routine to a person of skill in the art and are not considered a limiting aspect of the present invention.

The egg is illuminated for a photoperiod which can be continuous or, preferably, intermittent. As used herein, a "continuous" photoperiod is exposure of the egg to light without a dark period. A dark period or dark condition is a period of exposure of the egg to substantially no light. As used herein, an "intermittent" photoperiod includes a light period and a dark period. The light period and the dark period may each independently be, in increasing order of preference, at least about 3 minutes, at least about 10 minutes, at least about 15 minutes, at least about 20 minutes, most preferably, at least about 25 minutes. Thus, during incubation of an egg exposed to an intermittent photoperiod, the source of the monochromatic light will repeatedly cycle on and off during incubation. Optionally, more than one monochromatic light may be used during the light period, i.e., two or more monochromatic lights may be used at the same time during the light period. Alternatively, more than one monochromatic light may be used, but each monochromatic light used separately. For instance, an egg may be exposed repeatedly to a cycle of a first monochromatic light followed by a dark period, then a second monochromatic light followed by a dark period.

Optionally and preferably, the intensity of the monochromatic light illuminating the egg is controlled. Intensity may be measured within the egg, or, preferably, measured near or on the surface of the eggshell. Methods for measuring intensity are routine to a person of skill in the art. When measured near or on the surface of the egg, the lower range of intensity of the light illuminating the egg is typically at least about 0.01 watts/m$^2$, more preferably, at least about 0.08 watts/m². The higher range of intensity of the light measured near or on the surface of the eggshell is typically no greater than about 0.2 watts/m², more preferably, no greater than about 0.14 watts/m². Most preferably, the intensity of the light measured near or on the surface the eggshell is about 0.1 watts/m². When measured within the egg, the lower range of intensity of the light illuminating the egg is typically at least about 0.001 watts/m², more preferably, at least about 0.01 watts/m². The higher range of intensity of the light measured within the egg is typically no greater than about 0.1 watts/m², more preferably, no greater than about 0.05 watts/m². The intensity of the light applied to the eggs may be adjusted by, for instance, altering the number of lights present in an incubator. The temperature of the incubator can be adjusted to maintain the desired temperature ranges in accommodation of the thermal inputs represented by the lights.

Figure 2:
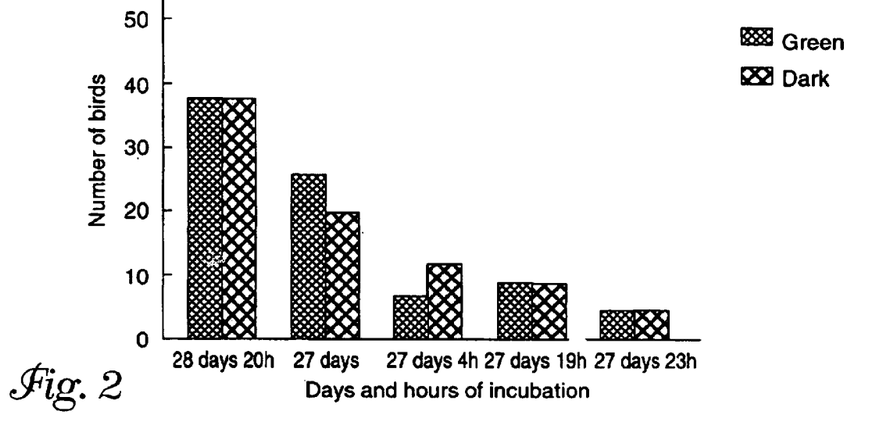
FIG. 2. Hatching time of large white Nicholas turkey eggs incubated under green light or dark conditions.

Preferably, exposure of an egg to a monochromatic light does not cause the hatch time of the egg to substantially increase or substantially decrease when compared to the hatch time of an egg incubated under the same conditions but not exposed to a monochromatic light (e.g., incubated in substantially no light). "Hatch time" refers to the period of time that elapses between the beginning of incubation of an egg and the time the bird is completely free of the egg. The hatch time of an egg that is not exposed to a monochromatic light may be determined by incubating a plurality of eggs under routine incubation conditions and determining the hatch time for each egg. The period of incubation that includes the largest number of hatched eggs is the hatch time for the specific incubation conditions used. For instance, as shown in FIG. 2, the hatch time for the eggs incubated under dark conditions or green light (560 nm) conditions was about 26 days and 20 hours. Preferably, the hatch time of eggs exposed to a monochromatic light is within about 6 hours, more preferably, within about 3 hours, most preferably, within about 2 hours of the hatch time of eggs incubated under the same conditions but not exposed to the monochromatic light.

Figure 1:
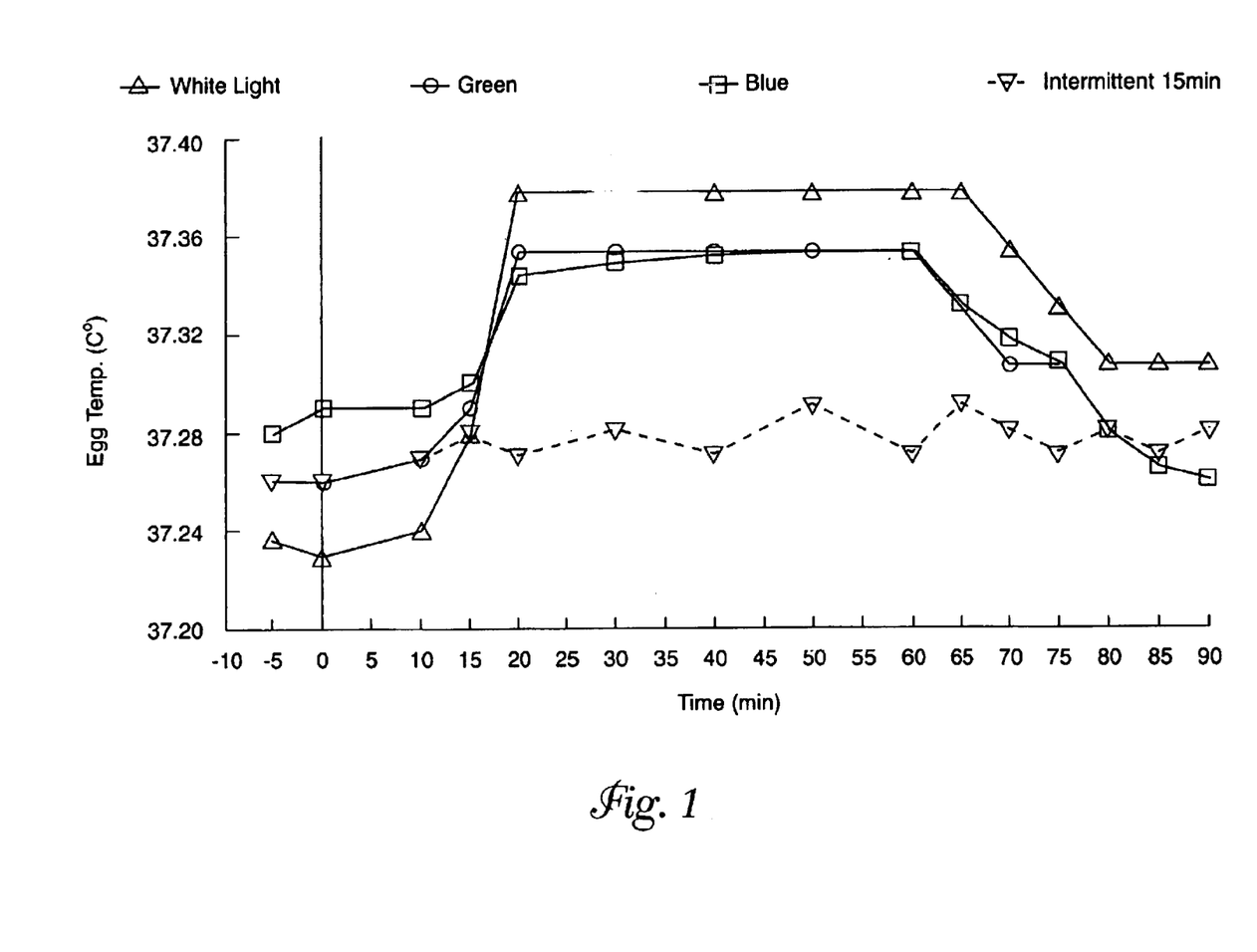
FIG. 1. Graph describing the relationship between photostimulation and egg overheating in broilers. Egg temp. (° C.), internal temperature of eggs; white light, light including all wavelengths of the visible spectrum; green, light having a wavelength of about 560 nanometers (nm); blue, light having a wavelength of about 480 nm; intermittent 15 min, light period of 15 minutes and dark period of 15 minutes; Time (min), time in minutes.

Increases in internal egg temperature affect poultry hatching times. For example, it is known that increases in internal egg temperature of 0.3° F. to 0.4° F. can accelerate hatching of the poultry by 6 to 8 hours (see, for instance, Romanoff, *Avian Embryo: structural and functional development*. MacMillan, N.Y (1960)). The radiation source preferably provides monochromatic light in a manner that does not overheat the contents of the egg. Several characteristics of the light can be controlled to avoid overheating of the egg contents. For example, the combination of the conditions of wavelength, intensity, and duration of exposure to the light may contribute to heating of the egg contents. The intermittent exposure of an egg typically decreases the heating of the egg contents when compared to continuous exposure. FIG. 1 describes the relationship of wavelength of applied light and duration of exposure to the internal temperature of eggs. The internal temperature of the eggs was measured using a thermocouple inserted into an egg during exposure. As shown in this Figure, application of white light including all wavelengths of the visible spectrum to poultry eggs resulted in the highest internal temperature of the egg after approximately 20 minutes of light application, and this increased temperature was maintained throughout the measurement period. In contrast, exposure with monochromatic green (wavelength of about 560 nm) or monochromatic blue light (wavelength of about 480 nm) provided an internal egg temperature increase that was less than the white light. Finally, as shown in FIG. 1, application of monochromatic green light in an intermittent pattern provided the lowest internal egg temperature increase throughout the measurement period. The intermittent light application shown in the Figure included a photoperiod of 15-minute periods of light application, followed by 15-minute periods of incubation in the dark.

In another aspect, the present invention provides a method for increasing a bird's weight, preferably, a female bird. The method includes exposing an egg to a monochromatic light for a photoperiod, and hatching the egg. The bird's weight is determined and compared to the weight of a bird incubated under the same conditions but not exposed to the monochromatic light during incubation. The weight of the birds is determined at least about 28 days after hatch, more preferably, at least about 59 days after hatch, most preferably, at least about 79 days after hatch. Preferably, the weight of a bird exposed to the monochromatic light is about 5 percent, more preferably, about 10 percent, greater than the weight of a bird not exposed to the monochromatic light.

The present invention also includes a method for increasing muscle weight in a bird, preferably, a female bird. The method includes exposing an egg to a monochromatic light for a photoperiod, and hatching the egg. The weight of one or more muscles of the bird, preferably, the breast muscle, is determined and compared to the weight of the same muscle(s) of a bird incubated under the same conditions but not exposed to the monochromatic light during incubation. The weight of the muscle(s) is determined at least about 28 days after hatch, more preferably, at least about 59 days after hatch, most preferably, at least about 79 days after hatch. Preferably, the weight of a breast muscle of a bird exposed to the monochromatic light is about 5 percent, more preferably, about 10 percent, greater than the weight of a breast muscle of a bird not exposed to the monochromatic light.

Another aspect of the invention includes a method for decreasing the mortality rate of a bird. The method includes exposing eggs to a monochromatic light for a photoperiod, and hatching the eggs. After the birds that hatch are allowed to grow for at least about 28 days, more preferably, at least about 59 days, most preferably, at least about 79 days, the number of birds that have died is determined, and compared to the number of birds that have died that hatched from eggs not exposed to monochromatic light. Preferably, the mortality rate of a bird hatching from an egg exposed to the monochromatic light is about 3 percent less, more preferably, about 6 percent less, than a bird hatching from an egg not exposed to the monochromatic light.

The present invention is illustrated by the following examples. It is to be understood that the particular examples, materials, amounts, and procedures are to be interpreted broadly in accordance with the scope and spirit of the invention as set forth herein.

EXAMPLES

Materials and Methods

Animals: Fertile eggs from large white Nicholas turkeys were obtained from Willmar Poultry Corporation (Willmar, Minn.). Eggs were selected by weight between 85–90 grams and placed a in commercial incubator as suggested by the manufacturer (Model 17H, Robbins Incubator Co., Denver, Colo.). Eggs were candled at 15 days of incubation and the fertility rate was recorded. At 25 days of incubation eggs were transferred to hatching trays. Upon hatching poults were recorded for hatching time, weighted, wing banded, and transferred to brooding rooms previously heated to 32° C. Birds were grown according to primary breeders recommendations. Feed and water were provided ad libitum.

Experiment one: 182 turkey eggs were used. Eggs were weighted, numbered and divided into two light treatment groups (n=91). The first group was photostimulated with green light provided by 5 LED lamps (peak wavelength 560 nanometers (nm), half band 15 nm) located above the eggs. Light intensity was 0.1 watts/m² at eggshell level, and was given intermittently; 3 minutes on and 3 minutes off. The second group was incubated under dark conditions and served as control. Body weights were recorded at 0, 2, 6, 13, 20, 28, 35, and 59 days of age. At the end of the experiment birds were killed and sexed.

Experiment two: 273 turkey eggs were used. Eggs were weighted, numbered and divided into 3 light treatment groups (n=91). The first group was photostimulated with green light provided by 7 LED lamps (peak wavelength 560 nm, half band 15 nm) located above the eggs. Light intensity was 0.14 watts/m² at eggshell level, and was given intermittently; 15 minutes on and 15 minutes off. The second group was photostimulated with white light provided by one mini-incandescent lamp located above the eggs. Light intensity was 0.14 watts/m² at eggshell level, and was provided as in group 1. The third group was incubated under dark conditions and served as control. Body weights were recorded at 0, 7, 14, 28, 42, 56, and 79 days of age. At the end of the experiment birds were killed, sexed and breast muscles (Pectoralis major and minor) were carefully removed from the sternum bone, cleaned from adhesive tissue and weighted.

Data was analyzed by two-way analysis of variance (SAS, User's Guide: Version 7, 1987, SAS Institute, Cary, N.C.).

Results

Experiment one: Table 1 summarizes hatching results. There were no significant differences between groups in both fertility and hatchability. Hatching time was similar between the treated groups (FIG. 2).

TABLE 1

Fertility and hatchability of large white turkey eggs incubated under green light or dark conditions.

| Treatment | n | Fertility | Hatchability |
| --- | --- | --- | --- |
| Green light | 91 | 97.1% | 93.4% |
| Dark | 91 | 96.9% | 92.3% | n, number of animals.
Fertility, percentage of eggs containing an embryo.
Hatchability, number of birds hatching from each group by the end of the hatching period.

Figure 3:
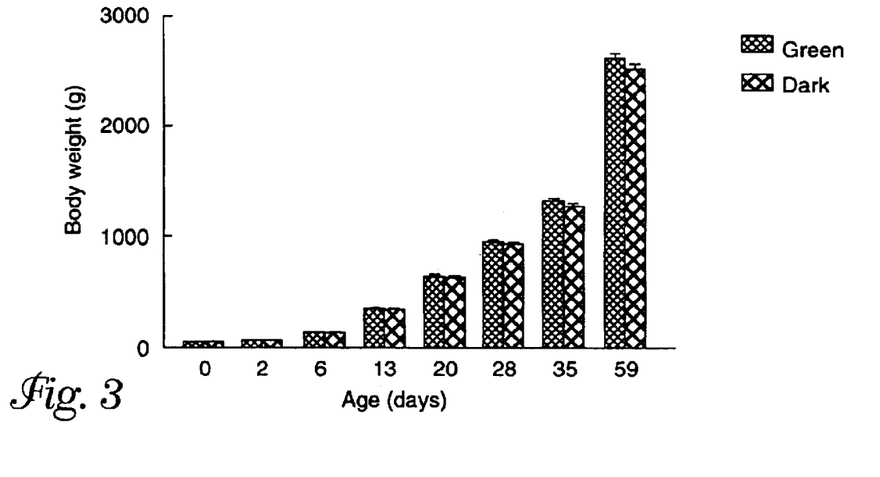
FIG. 3. Body weight of straight run flock of turkey poults incubated under green or dark conditions.

Body weight of straight run flock (males and females together) is presented in FIG. 3. There was an increase, although not significant, in body weight of birds incubated under green compared to the dark treated control.

Figure 4A:
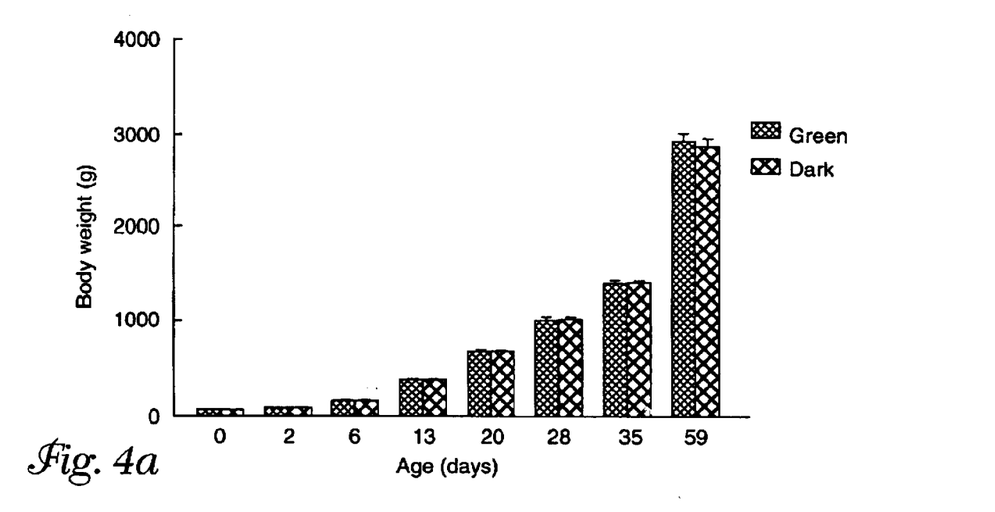
Figure 4B:
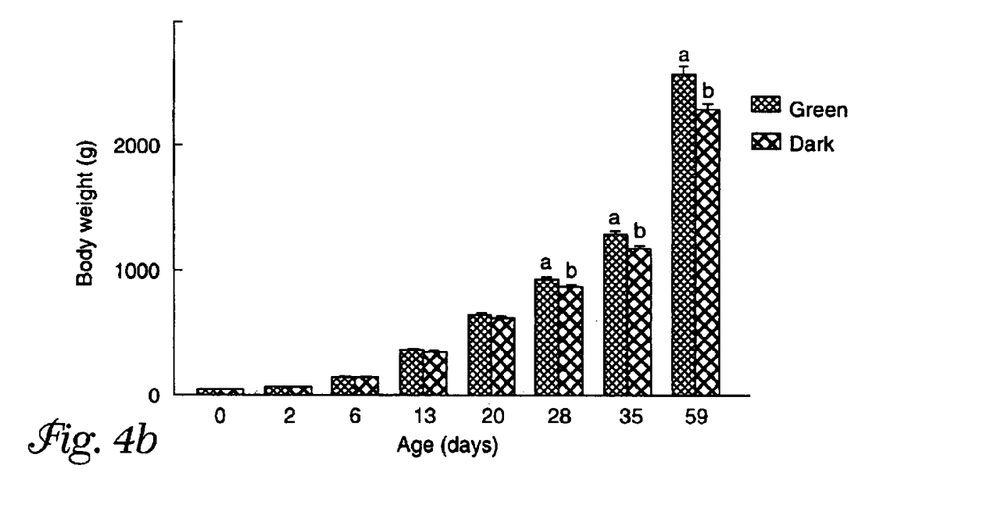

Analyzing the results by sex, revealed a significant increase in body weight in females starting at 28 days of age, remaining significant until the end of the experiment at 59 days of age (FIG. 4b). Body weight of males were similar in both light treatments (FIG. 4a).

Mortality rate was 9.5% for the green light incubated treated group, and 13% for the dark treated control group.

Figure 5:
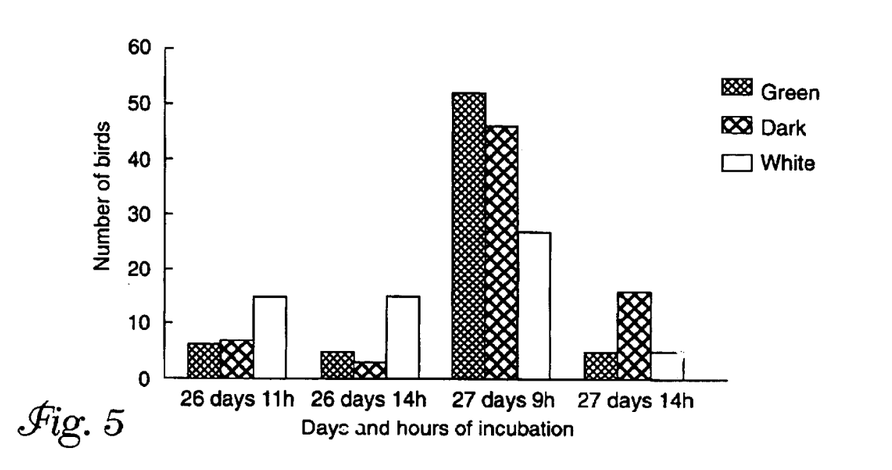
FIG. 5. Hatching timing of turkey poults incubated under green, white or dark light conditions.

Experiment 2. Table 2 summarizes hatching results. There were no significant differences between groups in both fertility and hatchability. Early hatch was detected in eggs incubated under white light. However, both green and dark incubated eggs had a similar peak of hatching at 27 days and 9 hours (FIG. 5).

TABLE 2

Fertility and hatchability of large white turkey eggs incubated under green light or dark conditions.

| Treatment | n | Fertility | Hatchability |
| --- | --- | --- | --- |
| Green light | 91 | 95.1% | 93.4% |
| Dark | 91 | 96.0% | 92.3% |
| White | 91 | 95.5% | 90.1% |

Figure 6:
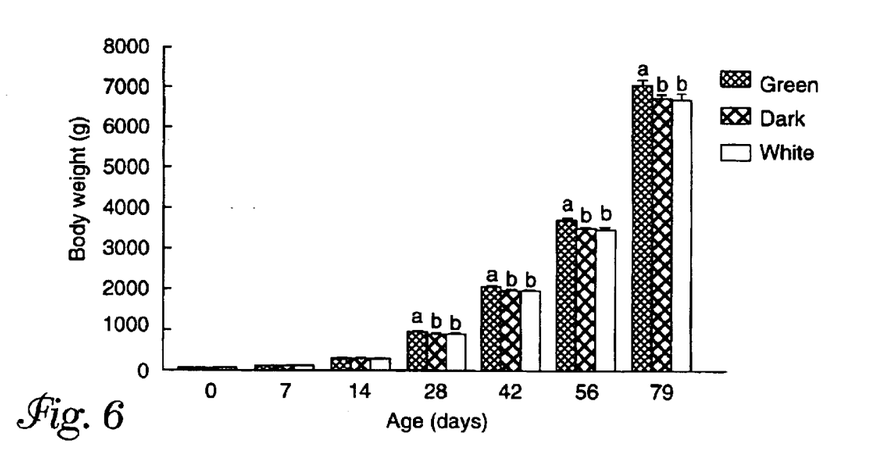
FIG. 6. Body weight results of straight run flock incubated under green, white, or dark light conditions. Bars represent mean ±S.E. Values marked with different letters are significantly different (P<0.05).
Figure 7A:
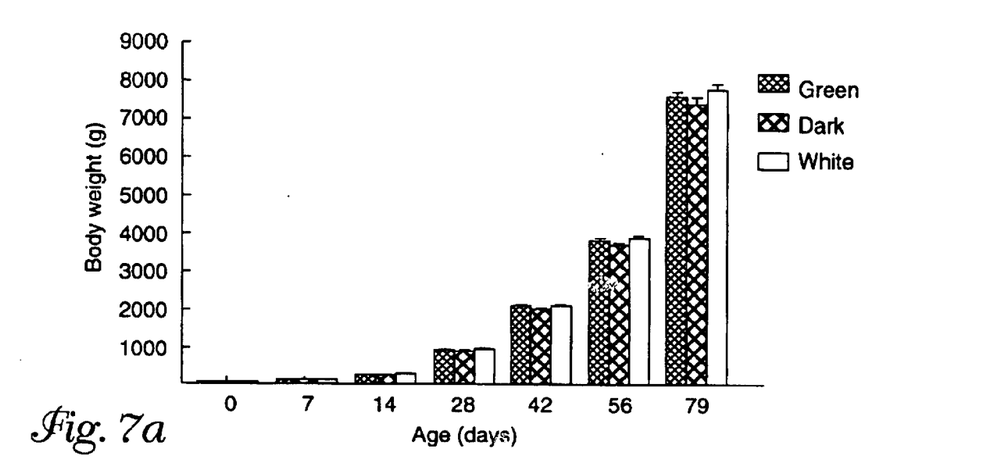
Figure 7B:
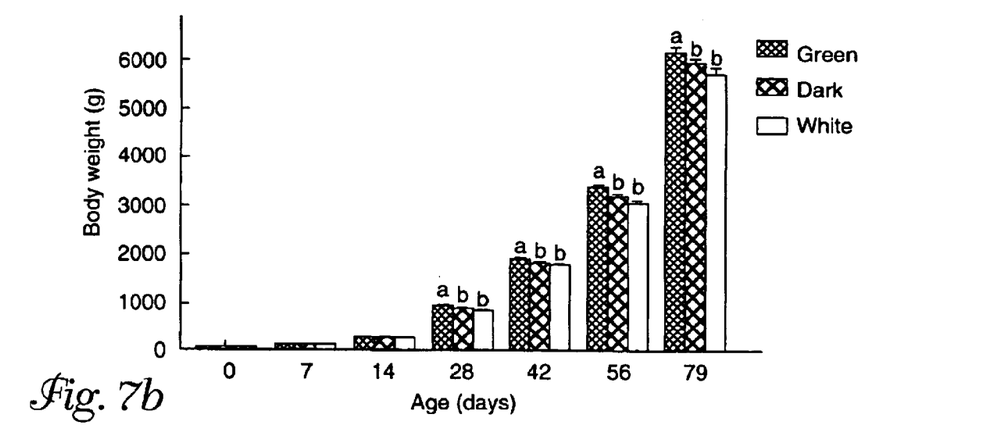

Significant increase in body weight of birds incubated under green light was detected after 28 age of age remaining till the end of the experiment at 79 days of age (FIG. 6). However, when body weight was analyzed by sex, different results were obtained (FIG. 7). No significant differences were found in body weight of males incubated under different light conditions. However, females incubated under green light were significantly heavier than all other treated groups from 28 days of age until termination of the experiment at 79 days of age.

Figure 8A:
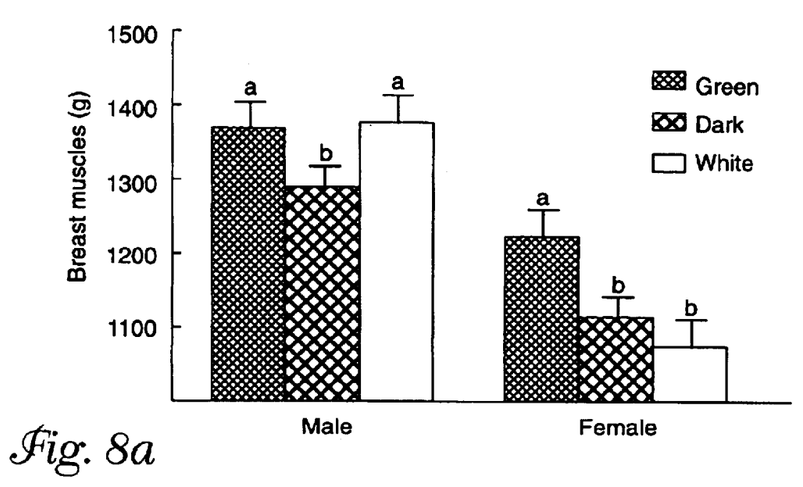
Figure 8B:
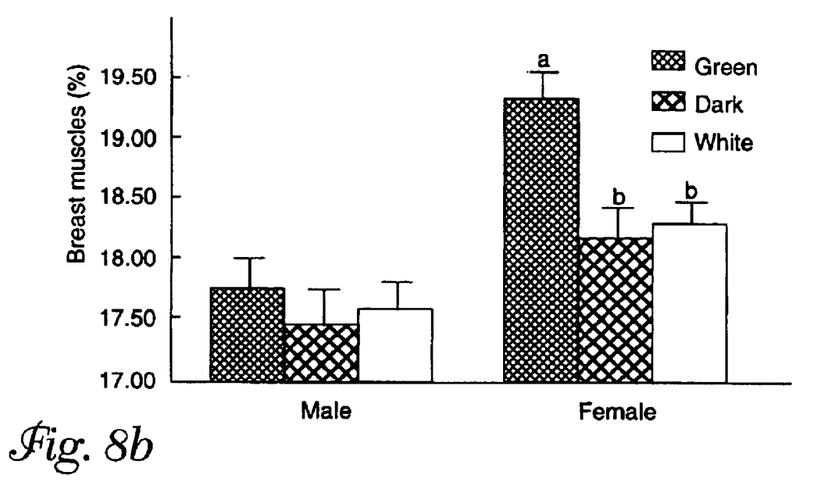

There was a significant depression in breast muscle weight in toms incubated under dark conditions, however, when presented as percentage of body weight, the differences remain without significance (FIGS. 8a, b).

Significant increase in breast muscle weight was detected in female turkeys incubated under green light, compared to white and dark incubation treatment groups. In addition, a significant increase in the percentage of breast muscles was detected in the green light incubated turkey hens.

Mortality rate was 7.4%, 13.8%, and 15.8% for the green dark and white light incubated treatment groups respectively.

Discussion

The results of the present study show that embryonic exposure to green light stimulates post hatch growth in turkeys. Photostimulation of birds by monochromatic green light after hatch was found to enhance body weight in Broilers (Wabeck and Skoglund, *Poultry Science*, 53, 2055–2059 (1974)). Quails (Phogat et al., *Poultry. Science*, 20, 126–128 (1985)) raised under blue or green fluorescent lamps gained significantly more weight than those reared under red or white fluorescent lamps, whereas feed conversion and mortality were not affected. Rozenboim et al. (*Poultry Science*, 78, 135–138 (1999)) had found that green light stimulate growth primarily at early age, while blue light enhances growth at a later age.

Rozenboim et al. studied the role of artificial light stimulation during embryonic development and found that in ovo photostimulation caused acceleration in embryo development and early hatch (Rozenboim et al., *Poultry Science*, 78, 135–138 (1975); *Poultry Science*, 54, 1415–1421 (1975); and *Poultry Science*, 55, 2483–2485 (1976)). Advanced hatching was found in embryos photostimulated with white light, which appeared to be due to an increase in egg temperature (for details see Romanoff, *Avian Embryo: structural and functional development*. MacMillan, N.Y. (1960)). In a preliminary setup we found that photostimulation of egg for 30 minutes with various wavelengths at an intensity of 0.1 W/m² caused an elevation in yolk temperature by 0.3° F., resulting in an early hatch of broiler chicks and turkey poults. The use of intermittent lighting described herein eliminated the early hatch associated with the increase in egg temperature. In the second experiment, although illuminated intermittently, an early hatch was detected in the white light treated birds, suggesting overheating of eggs due to better penetration of the long wavelength used by the mini-incandescent lamps. Fairchild and Christensen (*Poultry Science*, 79, 1627–31 (2000)) had shown that photostimulation of turkey eggs with incandescent lamps caused early hatch with no effect on hatchability, embryonic survival, liver or heart growth, and glycogen content. In this study, increased early post hatch mortality was detected in the white light photostimulated group suggesting that the embryonic overheating effect has a carry over impact on survival of the poults.

The results in both experiments revealed the greatest body weight increase in female turkeys treated with green light. The mechanism(s) underlying this phenomenon remained to be determined. Green light may enhance growth at early age by enhancing proliferation of skeletal muscle satellite cells (Halevy et al, *Comp. Biochem. Physiol. A Mol. Integr. Physiol.*, 120, 317–23 (1998)). Satellite cells are highly correlated with muscle growth and development (Halevy et al., *Gen. Comp. Endocrinol.*, 101, 43–52 (1996)), and can be manipulated via different growth factors or green light stimulation (Halevy et al, *Comp. Biochem. Physiol. A Mol. Integr. Physiol.*, 120, 317–23 (1998)). Tissue synthesis of insulin-like growth factor-I (IGF-I) is differently regulated within a given tissue and stage of incubation during embryogenesis in the turkey (McMurtry and Brocht, *Poultry Science*, 76, 894–900 (1997)), and the broiler embryos (Kocamis et al., 2000). In addition, sexual dimorphism in growth, associated to growth hormone stimulation, was previously found in rats. Female rats responded to growth hormone stimulation in a better growth rate then male rats (Rol de Lama et al., *Neuroendocrinol.*, 68, 210–219 (1998)).

The present results suggest that female turkeys are better receptive to in ovo photostimulation by green light as compared to male turkeys. In conclusion, the results of present study shows growth may be enhanced by manipulation of light spectra and can be used to increase production to the benefit of the poultry grower.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

All headings are for the convenience of the reader and should not be used to limit the meaning of the text that follows the heading, unless so specified.

What is claimed is:

1. A method for exposing an embryo to light, the method comprising exposing an egg to a monochromatic light for a photoperiod comprising a light period and dark period, wherein the monochromatic light has an intensity of at least about 0.001 watts/m$^2$ to no greater than about 0.2 watts/m$^2$.

2. The method of claim 1 wherein each light period and each dark period are each independently at least about 3 minutes.

3. The method of claim 1 wherein each light period and each dark period are each independently at least about 15 minutes.

4. The method of claim 1 wherein each light period comprises a period of about 3 to about 15 minutes, and wherein each dark period comprises a period of about 3 to about 15 minutes.

5. The method of claim 1 wherein the monochromatic light comprises a peak wavelength of at least about 500 nanometers (nm) to no greater than about 590 nm.

6. The method of claim 1 wherein the monochromatic light comprises a peak wavelength of at least about 550 nm to no greater than about 570 nm.

7. The method of claim 1 wherein the egg is a chicken egg or a turkey egg.

8. A method for exposing an embryo to light, the method comprising exposing an egg to a monochromatic light for a photoperiod comprising a light period and dark period, wherein each light period and each dark period are each independently at least about 3 minutes, wherein the monochromatic light comprises a peak wavelength of about 560 nm, half band +/− about 15 nm, and wherein the monochromatic light has an intensity of at least about 0.08 watts/m$^2$ to no greater than about 0.2 watts/m$^2$.

9. A method for increasing a bird's weight, the method comprising:
   exposing an egg to a monochromatic light for a photoperiod, wherein the photoperiod comprises a light period and a dark period, wherein each light period comprises a period of about 3 to about 15 minutes, and wherein each dark period comprises a period of about 3 minutes to about 15 minutes; and
   hatching the egg, wherein the bird that hatches from the egg has a greater weight at about 28 days after hatching compared to a bird that hatches from an egg not exposed to the monochromatic light.

10. A method for increasing a bird's weight, the method comprising:
    exposing an egg to a monochromatic light for a photoperiod, wherein the monochromatic light has an intensity of at least about 0.001 watts/m$^2$ to no greater than about 0.2 watts/m$^2$; and
    hatching the egg, wherein the bird that hatches from the egg has a greater weight at about 28 days after hatching compared to a bird that hatches from an egg not exposed to the monochromatic light.

11. A method for increasing a bird's weight, the method comprising:
    exposing an egg to a monochromatic light for a photoperiod comprising a light period and a dark period, wherein each light period and each dark period are each independently at least about 3 minutes, wherein the monochromatic light comprises a peak wavelength of about 560 nm, half band +/− about 15 nm, and wherein the monochromatic light has an intensity of at least about 0.08 watts/m$^2$ to no greater than about 0.2 watts/m$^2$; and
    hatching the egg, wherein the bird that hatches from the egg has greater weight at about 28 days after hatching compared to a bird that hatches from an egg not exposed to the monochromatic light.

12. A method for increasing muscle weight in a bird, the method comprising:
    exposing an egg to a monochromatic light for a photoperiod; and
    hatching the egg, wherein the bird that hatches from the egg has greater muscle weight at about 28 days after hatching compared to a bud that hatches from an egg not exposed to the monochromatic light.

13. The method of claim 12 wherein the photoperiod comprises a light period and a dark period.

14. The method of claim 13 wherein each light period and each dark period are each independently at least about 3 minutes.

15. The method of claim 13 wherein each light period and each dark period are each independently least about 15 minutes.

16. The method of claim 12, wherein each light period comprises a period of about 3 to about 15 minutes, and wherein each dark period comprises a period of about 3 to about 15 minutes.

17. The method of claim 12 wherein the monochromatic light comprises a peak wavelength of at least about 500 nm to no greater than about 590 nm.

18. The method of claim 12 wherein the monochromatic light comprises a peak wavelength of at least about 550 nm to no greater than about 570 nm.

19. The method of claim 12 wherein the monochromatic light has an intensity of least about 0.001 watts/m$^2$ to no greater than about 0.2 watts/m$^2$.

20. The method of claim 12 wherein the egg is a chicken egg or a turkey egg.

21. The method of claim 12 wherein the muscle is breast muscle.

22. A method for increasing muscle weight in a bird, the method comprising:

exposing an egg to a monochromatic light for a photoperiod comprising a light period and a dark period, wherein the monochromatic light comprises a peak wavelength of at least about 550 nm to no greater than about 570 nm; and hatching the egg, wherein the bird that hatches from the egg has greater muscle weight at about 28 days after hatching compared to a bird that hatches from an egg not exposed to the monochromatic light.

23. A method for increasing muscle weight in a bird, the method comprising:

exposing an egg to a monochromatic light for a photoperiod comprising a light period and a dark period, wherein each light period and each dark period are each independently at least about 3 minutes, and wherein the monochromatic light comprises a peak wavelength of at least about 550 nm to no pester then about 570 nm; and hatching the egg, wherein the bird that hatches from the egg has greater muscle weight at about 28 days after hatching compared to a bird that hatches from an egg not exposed to the monochromatic light.

24. A method for increasing muscle weight in a bird, the method comprising:

exposing an egg to a monochromatic light for a photoperiod comprising a light period and a dark period, wherein each light period and each dark period we each independently at least about 3 minutes, wherein the monochromatic light comprises a peak wavelength of about 560 nm, half band +/− about 15 nm, and wherein the monochromatic light has an intensity of at least about 0.08 watts/m$^2$ to no greater than about 0.2 watts/m$^2$; and hatching the egg, wherein the bird that hatches from the egg has greater muscle weight at about 28 days after hatching compared to a bird that hatches from an egg not exposed to the monochromatic light.

25. A method for decreasing a mortality rate of a bird, the method comprising:

exposing in egg to a monochromatic light fix a photoperiod, wherein the photoperiod comprises a light period and a dark period, wherein each light period comprises a period of about 3 to about 15 minutes, and wherein each dark period comprises a period of about 3 to about 15 minutes, and hatching the egg, wherein the mortality rate of a bird that hatches from the egg has a lower mortality rate compared to a bird that hatches from an egg not exposed to the monochromatic light.

26. A method for decreasing a mortality rate of a bird, the method comprising:

exposing an egg to a monochromatic light for a photoperiod, wherein the monochromatic light has an intensity of at least about 0.001 watts/m$^2$ to no greater than about 0.2 watts/m$^2$; and hatching the egg, wherein the mortality rate of a bird that hatches egg has a lower mortality rate compared to a bird that hatches from an egg not exposed to the monochromatic light.

27. A method for decreasing a mortality rate of a bird, the method comprising:

exposing an egg to a monochromatic light for a photoperiod comprising a light period and a dark period, wherein each light period and each dark period are each independently at least about 3 minutes, and wherein the monochromatic light comprises a peak wavelength of about 560 nm, half band +/− about 15 nm, and wherein the monochromatic light has an intensity of at least about 0.08 watts/m$^2$ to no greater than about 0.2 watts/m$^2$; and hatching the egg, wherein the mortality rate of a bird that hatches from the egg has a lower mortality rate compared to a bird that hatches from an egg not exposed to the monochromatic light.

28. A method for exposing an embryo to light, the method comprising exposing an egg to a monochromatic light for a photoperiod comprising a light period and dark period, wherein each light period comprises a period of about 3 to about 15 minutes, and wherein each dark period comprises a period of about 3 to about 15 minutes.

29. The method of claim 28 wherein the monochromatic light comprises a peak wavelength of at least about 500 nanometers (nm) to no greater than about 590 nm.

30. The method of claim 1 wherein the monochromatic light comprises a peak wavelength of at least about 550 nm to no greater than about 570 nm.

31. The method of claim 28 wherein the monochromatic light has an intensity of at least about 0.001 watts/m$^2$ to no greater than about 0.2 watts/m$^2$.

32. The method of claim 28 wherein the egg is a chicken egg or a turkey egg.

* * * * *

UNITED STATES PATENT AND TRADEMARK OFFICE
CERTIFICATE OF CORRECTION

| | | |
|---|---|---|
| PATENT NO. | : 6,789,500 B2 | Page 1 of 1 |
| DATED | : September 14, 2004 | |
| INVENTOR(S) | : Israel Rozenboim | |

It is certified that error appears in the above-identified patent and that said Letters Patent is hereby corrected as shown below:

<u>Title page,</u>
Item [56], References Cited, FOREIGN PATENT DOCUMENTS, delete "RU  1831281  A  7/1993" and insert -- SU  1831281  A  7/1993 --.

<u>Column 11,</u>
Line 4, after the word "claim", delete "12" and insert -- 13 --.

<u>Column 12,</u>
Line 49, after the word "claim", delete "1" and insert -- 28 --.

Signed and Sealed this

Fifth Day of April, 2005

JON W. DUDAS
*Director of the United States Patent and Trademark Office*